(12) United States Patent
Diels et al.

(10) Patent No.: US 9,230,712 B2
(45) Date of Patent: Jan. 5, 2016

(54) FLEXIBLE PLASTIC HOSE AND METHOD FOR ITS MANUFACTURE

(75) Inventors: Domin Diels, Gierle (BE); Marnix Kerkhofs, Balen (BE)

(73) Assignee: PLASTIFLEX GROUP, Paal-Beringen (BE)

( * ) Notice: Subject to any disclaimer, the term of this patent is extended or adjusted under 35 U.S.C. 154(b) by 22 days.

(21) Appl. No.: 14/119,385

(22) PCT Filed: May 23, 2012

(86) PCT No.: PCT/IB2012/052586
§ 371 (c)(1),
(2), (4) Date: Nov. 21, 2013

(87) PCT Pub. No.: WO2012/160524
PCT Pub. Date: Nov. 29, 2012

(65) Prior Publication Data
US 2014/0076605 A1   Mar. 20, 2014

(30) Foreign Application Priority Data

May 23, 2011   (BE) .................................. 2011/0314

(51) Int. Cl.
| | |
|---|---|
| *F16L 11/16* | (2006.01) |
| *H01B 7/00* | (2006.01) |
| *B29C 53/78* | (2006.01) |
| *F16L 11/127* | (2006.01) |
| *B29L 23/18* | (2006.01) |

(52) U.S. Cl.
CPC  *H01B 7/00* (2013.01); *B29C 53/78* (2013.01);
*F16L 11/127* (2013.01); *F16L 11/16* (2013.01);
*B29L 2023/18* (2013.01)

(58) Field of Classification Search
CPC .................................... F16L 11/16; F16L 9/16
USPC .................. 138/129, 154, 122, 150; 156/195; 174/98
See application file for complete search history.

(56) References Cited

U.S. PATENT DOCUMENTS 3,273,600 A * 9/1966 Swan ............................ 138/122
3,910,808 A   10/1975 Steward
(Continued)

FOREIGN PATENT DOCUMENTS

| DE | 94 08 929 U1 | 8/1994 |
|---|---|---|
| EP | 0 062 721 A1 | 10/1982 |

(Continued)

OTHER PUBLICATIONS

International Search Report of PCT/IB2012/052586 dated Oct. 12, 2012.

(Continued)

*Primary Examiner* — Patrick F Brinson
(74) *Attorney, Agent, or Firm* — Sughrue Mion, PLLC (57) ABSTRACT

Flexible plastic hose comprising a flexible wall made out of a plurality of laterally connected windings of a helically wound profile, wherein the windings of the profile are attached to each other by means of a weld, wherein the profile comprises a web part with predetermined properties for providing flexibility to the hose, and wherein the profile ends on both sides in an upright part. The weld is located between the upright part of the adjacent windings and together with these upright parts forms a helical reinforcement rib on the flexible wall of the hose with predetermined properties for providing hub strength to the hose.

16 Claims, 6 Drawing Sheets

(56) References Cited

U.S. PATENT DOCUMENTS

| | | | |
|---|---|---|---|
| 4,121,624 A | * | 10/1978 | Chen .................... 138/122 |
| 4,337,800 A | * | 7/1982 | Carlson et al. .............. 138/122 |
| 4,375,381 A | | 3/1983 | Carlson et al. |
| 4,420,019 A | * | 12/1983 | Dillon .................... 138/129 |
| 4,589,448 A | * | 5/1986 | del Valle .................. 138/122 |
| 4,719,945 A | * | 1/1988 | Richards et al. ............ 138/154 |
| 4,928,735 A | * | 5/1990 | Richards et al. ............ 138/154 |
| 5,329,973 A | * | 7/1994 | Kanao ..................... 138/154 |

FOREIGN PATENT DOCUMENTS

| | | |
|---|---|---|
| EP | 1 384 429 A1 | 1/2004 |
| EP | 1 557 257 A1 | 7/2005 |

OTHER PUBLICATIONS

Belgian Search Report of Belgian Patent Application No. 2011/00314 dated Dec. 29, 2011.

* cited by examiner

FLEXIBLE PLASTIC HOSE AND METHOD FOR ITS MANUFACTURE

CROSS REFERENCE TO RELATED APPLICATIONS

This is a National Stage of International Application No. PCT/IB2012/052586 filed May 23, 2012, claiming priority based on Belgian Patent Application No. 2011/0314 filed May 23, 2011, the contents of all of which are incorporated herein by reference in their entirety.

TECHNICAL FIELD

This invention relates to a flexible plastic hose according to the preamble of the first independent claim.

This invention also relates to a method of manufacturing the flexible plastic hose according to the preamble of the second independent claim.

PRIOR ART

U.S. Pat. No. 3,910,808 describes a method to wind an extruded profile into a flexible hose which can be used for medical applications.

U.S. Pat. No. 4,375,381 describes a method wherein a U-shaped profile is being wound up. The U-shaped profile is helically welded to a second hot extruded profile, which is positioned on top of the end of the upright legs of two parallel profile windings.

These methods have as foremost disadvantage that the profiles need to be wound when hot, such that the axial production rate is fairly low (up to 1-1.5 m/min).

DESCRIPTION OF THE INVENTION

It is an object of the invention to provide a hose that can be produced at a higher production rate.

This object can be reached according to the invention by means of a hose which shows all the features of the first independent claim.

It is also an object of the invention to provide a method for manufacturing the hose by means of helically winding a profile, with which a higher production rate can be attained.

This object can be reached according to the invention with a method which shows all of the steps of the second independent claim.

The invention concerns a flexible plastic hose comprising a flexible wall made out of a plurality of laterally connected windings of a helically wound profile, wherein the windings of the profile are attached to each other by means of a weld, wherein the profile comprises a web part with predetermined properties for providing flexibility to the hose, and wherein the profile ends on both sides in an upright part. The weld is located between the upright parts of adjacent windings and together with these upright parts forms a helical reinforcement rib on the flexible wall of the hose with predetermined properties for providing a given hub strength to the hose. This means that the rib ensures that, when the hose is bent, it will not buckle, and when compressed, the hose will return to its original shape in absence of the compressive force.

Hoses of the type that have a web part alternating with a rib part are already known, as well as the predetermined properties that the web part and rib part need to have in order to obtain the desired flexibility and hub strength. Hence, these predetermined properties require herein no further explanation.

With the hose according to the invention, it is possible to obtain higher production rates, because the extruded profile can be cooled before the helical winding and hence, no extra cooling is required during or after the helical winding of the profile for forming the flexible wall of the hose. The hot welding material will be placed between the upright parts of the adjacent profiles. The upright parts move along the weld which therefore does not come in contact with the tooling of the production facility. As a result, an axial production rate of for example 5 m/min can be obtained. Also, it turns out that the profile of the hose according to the invention shows the surprising effect that hoses can be produced with smaller internal diameters (for example 19 mm or smaller) than with the prior art profiles.

Also, it turns out that the profile of the hose according to the invention shows the surprising effect that the total weight of the hose can be reduced.

Also, it is possible with the profile of the hose according to the invention to make hoses of which the inside is substantially smooth, that is to say that there are almost no ridges or notches that will open up when the hose is bent or pulled and in which dirt of the medium transported through the hose can accumulate.

In preferred embodiments of the hose according to the invention, the upright parts on one side or on both sides of the profile are provided with a horizontal leg, which extends in line with the web part and in the direction of the adjacent winding. These horizontal legs form spacers which creates a well-defined area between the upright parts, provided for incorporating the weld.

In preferred embodiments of the hose according to the invention, the upright parts are folded towards each other at the top, in such a way that they substantially completely enclose the weld. Preferably, the folding of the upright parts occurs in the production process after the application of the welding material. However, the upright parts can also be formed in this manner in the extrusion step.

In preferred embodiments of the hose according to the invention, the upright parts comprise protrusions directed towards the adjacent winding in such a way that these protrusions overlap. These protrusions ensure a larger contact area between the welding material and the profile windings, in such a way that the connection of two adjacent windings by means of the weld can be reinforced.

In preferred embodiments of the invention, one or more electrical conductors/cables are incorporated into the rib part (in the upright parts, in the weld or between upright parts and the weld) and/or the web part. These can be heating wires, but also communication lines, temperature-sensitive wires, signalling wires etc.

One of the advantages of the technique according to the invention is that it is simpler to incorporate such conductors/cables into the web part. Existing production methods according to the prior art use a hot wound profile. However, it is rather difficult to check and secure the position of the conductors/cables in the heated web part when these are helically wound whilst hot. Hence, the plastic material of the web part is in the semi-liquid stage and has little strength to keep the wires in place.

According to the invention, the profile can be cooled down after extrusion to a temperature below the softening temperature of the used plastic material(s). Therefore, it is possible, for example, to extrude the profile in a straight way without bending it in a water tank. The web part with the electrical (or other) wires will then be cooled down and will fixate the wires in the web in a specific position. Only when the profile is sufficiently cooled down (for example maximum 60° C., depending on the plastic material) and the wires are fixated in the web part, the profile will be helically wound.

SHORT DESCRIPTION OF THE DRAWINGS

The invention shall now be explained in more detail by means of the description below and the added drawings.

EMBODIMENTS OF THE INVENTION

Hereafter, the present invention will be described by means of specific embodiments and with reference to certain drawings, yet the invention is not limited thereto and will only be defined by the claims. The drawings provided here are merely schematic representations and are not limiting. In the drawings, dimensions of certain parts can be shown enlarged, which means that the parts involved are not depicted on scale, and this merely for illustrative purposes. The dimensions en the relative dimensions do not necessarily correspond with the practical embodiments of the invention.

Furthermore, certain terms such as "first", "second", "third" and the like will be used in the description and claims to make a distinction between similar elements and are not necessarily meant to indicate a sequential or chronological order. The terms in question are interchangeable in the conditions appropriate therefore, and the embodiments of the invention may work in other sequences than those that are illustrated or described here.

Furthermore, terms such as "top", "bottom", "above", "under", and the like in the description and in the claims are used for descriptive purposes and not necessarily to indicate relative positions. The said terms used are interchangeable in the conditions appropriate therefore, and the embodiments of the invention may work in other orientations than described or illustrated here.

The term "comprising" and derivative terms, as they are used in the claims, should not be interpreted as limited to the means that are mentioned thereafter; the term does not exclude other elements or steps. The term should be interpreted as a specification of the mentioned properties, integers, steps, or components that are referred to, without excluding the presence or the addition of additional properties, integers, steps, or components, or groups thereof. The scope of an expression such as "a device comprising means A and B" is therefore not only restricted to devices that merely consist of components A and B. On the other hand, what is meant is that, as far as the present invention is concerned, the only relevant components are A and B.

Figure 1:
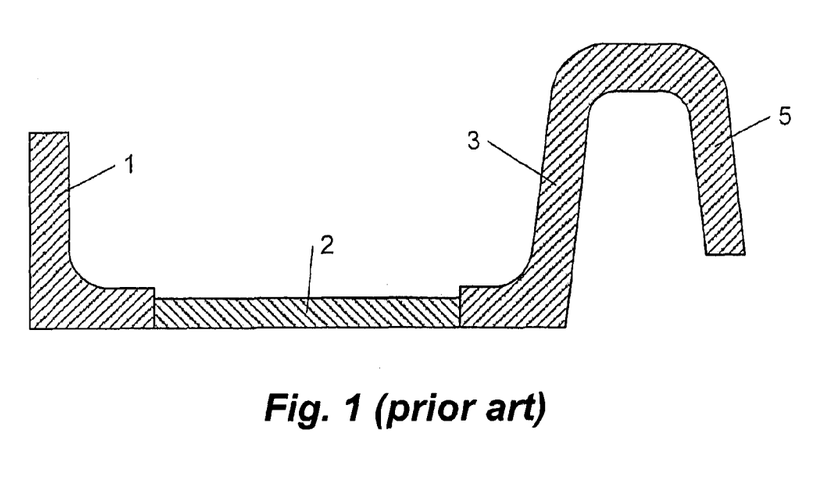
FIGS. 1 and 2 show cross sections of a part of a hose according to the prior art.
Figure 2:
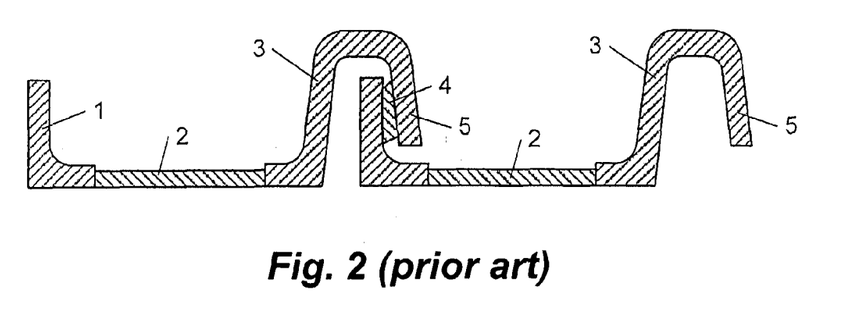

FIGS. 1 and 2 respectively show a cross section of an extruded plastic profile and two adjacent windings of a hose according to the prior art. The extruded profile comprises an upright part 1, a flat web part 2 and an inverted U-shaped part 3, which forms the rib part of the hose. The weld 4 is applied in this classic embodiment between the upright part 1 and the hanging part 5 and the rib part 3.

Figure 3:
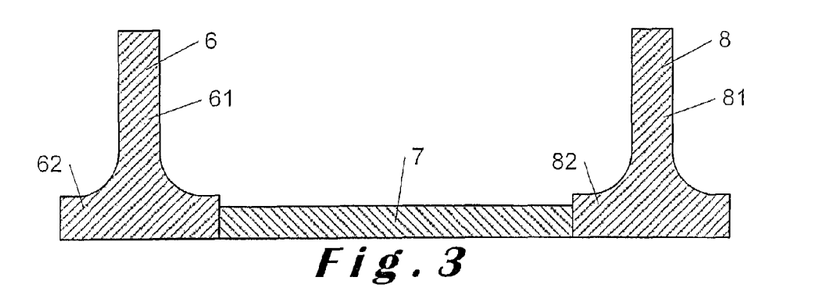
FIGS. 3 and 4 show cross sections of a part of a hose according to a first preferred embodiment of the invention.
Figure 4:
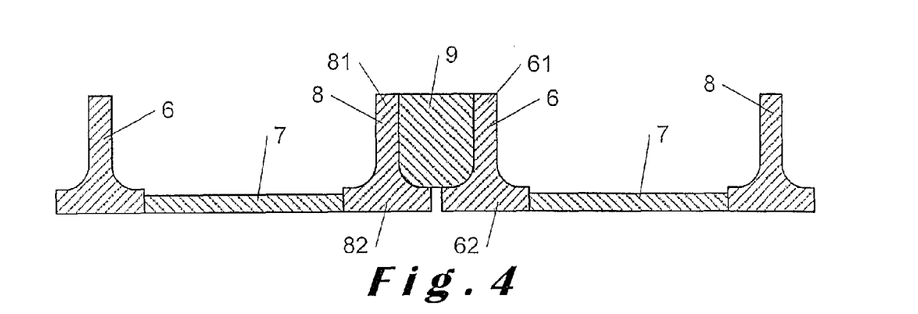

FIGS. 3 and 4 respectively show a cross section of an extruded plastic material profile and two adjacent windings of a hose according to the first embodiment of the invention. The extruded profile comprises on both sides an inverted T-shaped part 6, 8, and in the middle a flat web part 7. The inverted T-shaped part 6, 8 shows an upright part 61, 81 and a horizontal leg 62, 82 in line with the web part 7. These horizontal legs 62, 82 of the adjacent windings are facing each other and therefore create a distance between the upright parts 61, 81, such that a space is created which is substantially completely filled with welding material 9. The welding material 9 is therefore nearly entirely located between the upright parts 61, 81. The upright parts 61, 81, together with the weld 9, form a reinforcement rib with a helical course along the hose.

The hose of FIGS. 3 and 4 is manufactured by successively: extruding the profile, cooling down the profile, winding the cooled profile for obtaining the adjacent windings that make up the exterior of the hose, and applying the welding material between the upright parts. The welding material is heated to a temperature above the softening temperature (semi-liquid phase), for example 150 to 270° C., depending on the used plastic materials.

Figure 5:
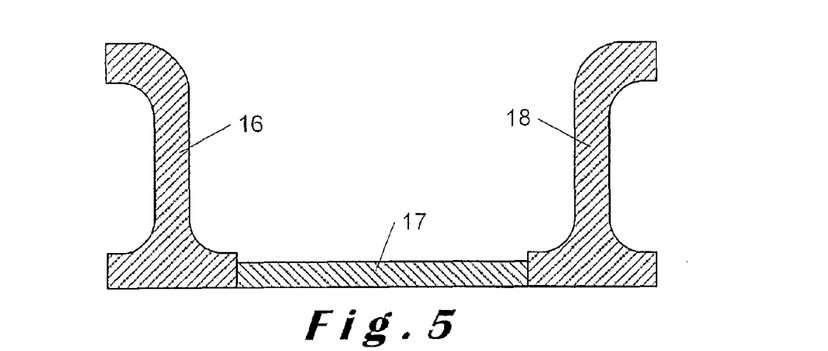
FIGS. 5 and 6 show cross sections of a part of a hose according to the second preferred embodiment of the invention.
Figure 6:
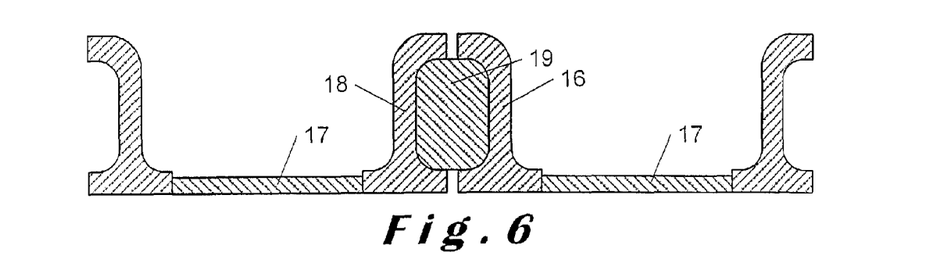

FIGS. 5 and 6 respectively show a cross section of an extruded plastic profile and two adjacent windings of a hose according to a second embodiment of the invention. The extruded profile is equivalent to that of FIGS. 3 and 4 and comprises two inverted T-shaped parts 16, 18 with in between a web part 17. The inverted T-shaped parts 16, 18 of the adjacent windings are folded towards each other on the top, in such a way that they substantially completely enclose the welding material 19. In this way, a hose is obtained which looks well finished on the outside. The folding can be done after the application of the welding material 19 between the upright parts 16, 18. On the other hand, the profile can also be extruded in this shape, in which the weld needle which is used to apply the weld, will then be positioned under the surface of the hanging part when inserting the profile in the winding device.

Figure 7:
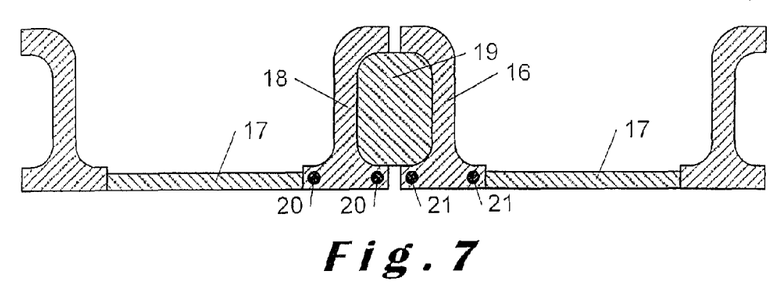
FIG. 7-17 show cross sections of a part of a hose according to alternative embodiments of the invention.

The embodiment according to FIG. 7 is substantially equivalent to that of FIGS. 5 and 6. The difference is that the inverted T-parts 16, 18 comprise two electrical conductors 20, 21.

Figure 8:
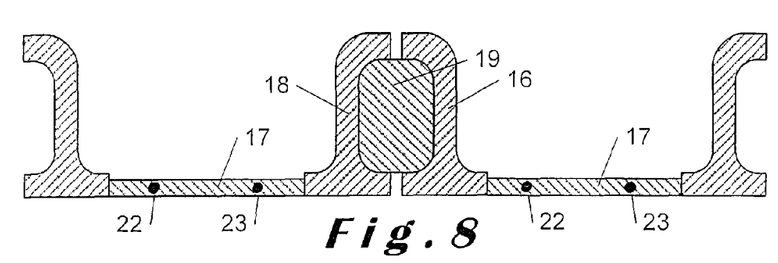

The embodiment according to FIG. 8 is substantially equivalent to that of FIG. 7. The difference is that the electrical conductors 22, 23 are integrated into web part 17.

Figure 9:
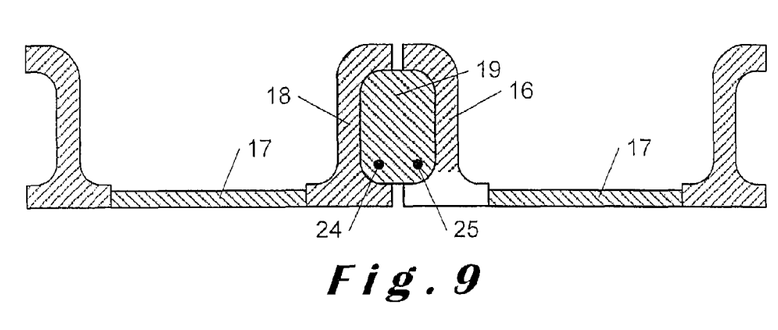

In the embodiment according to FIG. 9, two electrical conductors 24, 25 are integrated into the welding material 19.

In alternative embodiments, the conductors may also be installed between the upright parts and the weld.

Figure 10:
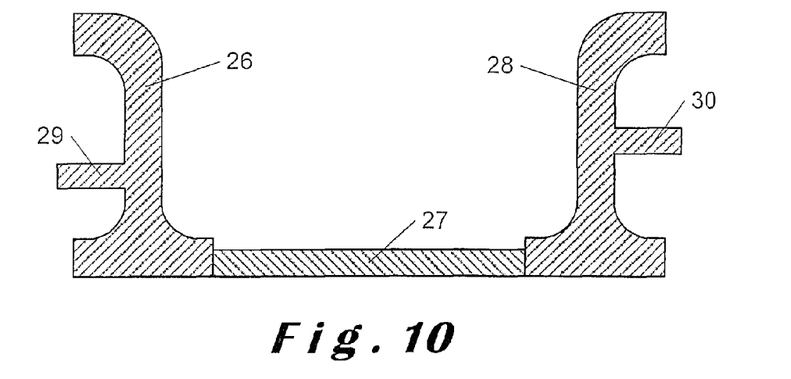
Figure 11:
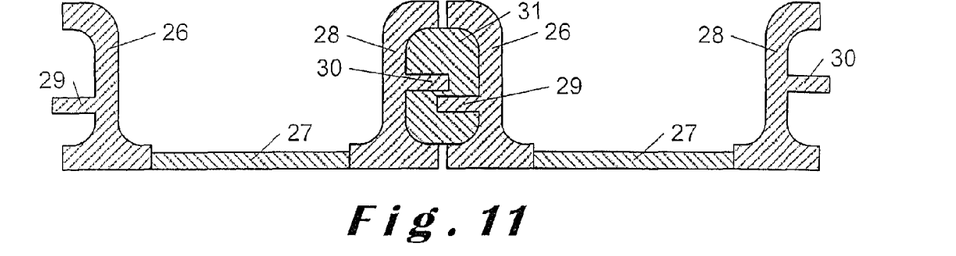

In the embodiment of FIGS. 10 and 11, the upright parts 26, 28 on both sides of web part 27 comprise protrusions 29, 30 directed towards the adjacent winding and in such a way that these protrusions 29, 30 overlap each other. These protrusions ensure a larger contact area between welding material 31 and the upright parts 26, 28 of the profile windings, in such a way that the adhesion of the two adjacent windings by means of weld 31 can be reinforced.

Figure 12:
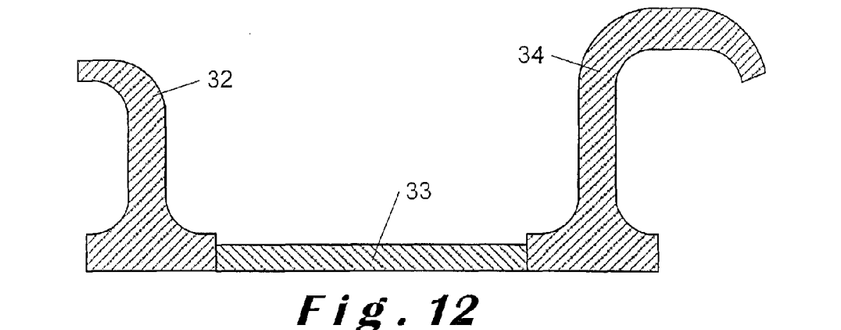
Figure 13:
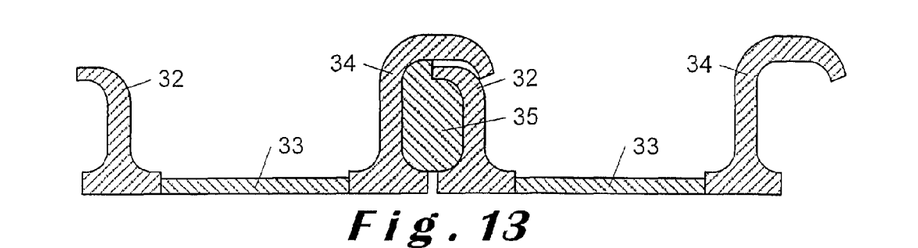

In the embodiment of FIGS. 12 and 13 the extruded profile is equivalent to that of FIGS. 5 and 6 and comprises two inverted T-shaped parts 32, 34 with in between a web part 33. The inverted T-shaped parts 32, 34 of the adjacent windings are folded towards each other at the top and overlap each other in such a way that the welding material 35 is completely enclosed. Because of this, a hose is provided that looks well finished on the outside. The folding can be done after the application of the welding material 35 between the upright parts 32, 34. On the other hand, the profile can also be extruded in this shape, in which the weld needle which is used to apply the weld, will then be positioned under the surface of the hanging part when inserting the profile in the winding device.

Figure 14:
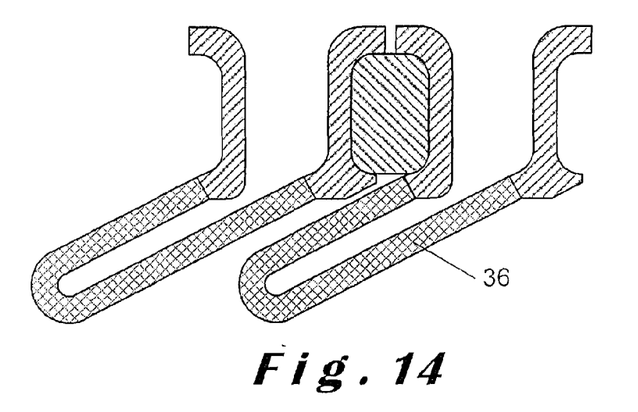

In the embodiment of FIG. 14, the web part 36 shows an unfoldable part that is provided to be unfolded when an axial tensile force is exerted onto the hose, such as to provide an elongation of the hose.

Figure 15:
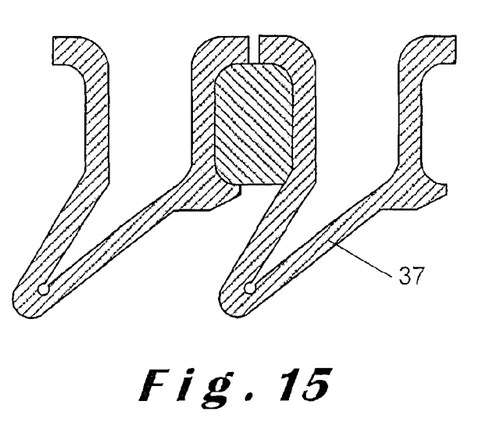
Figure 16:
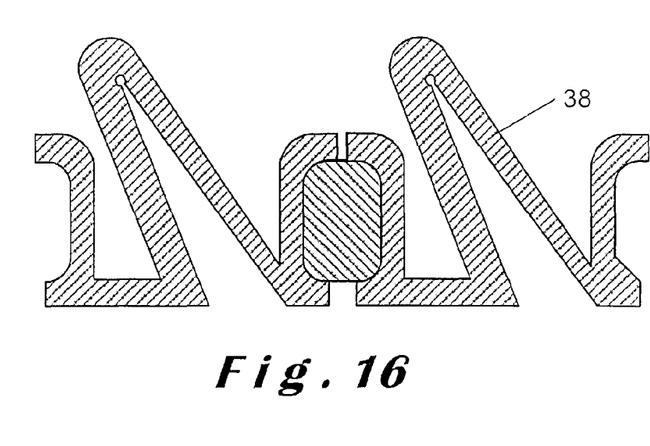

In the embodiment of FIGS. 15 and 16, web part 37, 38 shows collapsible parts, respectively directed inwards or outwards, which are movable between two stable positions: a folded position (as depicted in FIGS. 15 and 16) and a extended position (not depicted). Such folding parts with two stable positions are known from the hinge parts of straws, but can also be applied to this type of hose.

In all shown embodiments of the invention, the rib part has predetermined properties, more in particular choice of material and strength, predetermined for the provision of a certain hub strength to the hose.

In all shown embodiments of the invention the web part has predetermined properties, more in particular choice of material and wall thickness, predetermined for the provision of a certain flexibility to the hose.

The materials for the web part could be: PE, PP, PVC, polyester, PU, or other known plastic materials.

The materials for the upright parts of the profile could be: PE, PP, polyester, PU, or other known plastic materials.

The welding material needs to be compatible with the material used for the upright legs of the U-profile. Therefore the weld can, for example, comprise a coating of the same material.

In the above, the invention was illustrated for the sake of simplicity on the basis of a single profile that is helically wound. It is also possible, according to the invention, to winding more than one profile next to each other in order to obtain a hose according to the invention with a multiple winding pitch, wherein the adjacent profiles need not necessarily to have the same shape with regard to their cross section. In the latter case, each profile can either be welded separately, or multiple profiles can be extruded as a whole. In this manner, it is for example possible for a hose with a pitch of three profiles, that the three profiles are connected with three different welds. But it is also possible to extrude all three different profiles as one profile, and to connect this profile with one weld.

In the above, welding of the profiles according to the invention was described as welding by extrusion of a welding material. However, it is also possible to connect the profiles to each other by means of another method (ex. hot air, laser, IR-radiation, . . . ).

In further embodiments according to the invention, it is possible to embed an electrical conductor/cable in the web part or rib part, which is connected to a sensor, which is, for example, located near a coupling element at an end of the hose and which is provided in order to measure, for example, temperature, humidity, or other parameters of the medium transported through the hose.

In embodiments according to the invention, it is possible to provide a tube on the inside of the flexible wall (which is formed by the concatenated profiles), that extends in the longitudinal direction of the hose and which is provided to transport a second medium, or to absorb a stress relief, or to incorporate an electrical conductor/cable, or for other purposes.

In embodiments according to the invention, it is possible to provide an electrical conductor/cable on the inside of the flexible wall (which is formed by the concatenated profiles), for example a resistance wire with a helical configuration course to heat the medium inside the hose.

In embodiments according to the invention, it is possible to provide a wire or cable (for example an electrical conductor/cable, signalling wire or others) on the outside of the flexible wall (which is formed by the concatenated profiles) that is kept in place around the flexible wall by means of a jacket, which is applied around the outside for example by means of extrusion.

Figure 17:
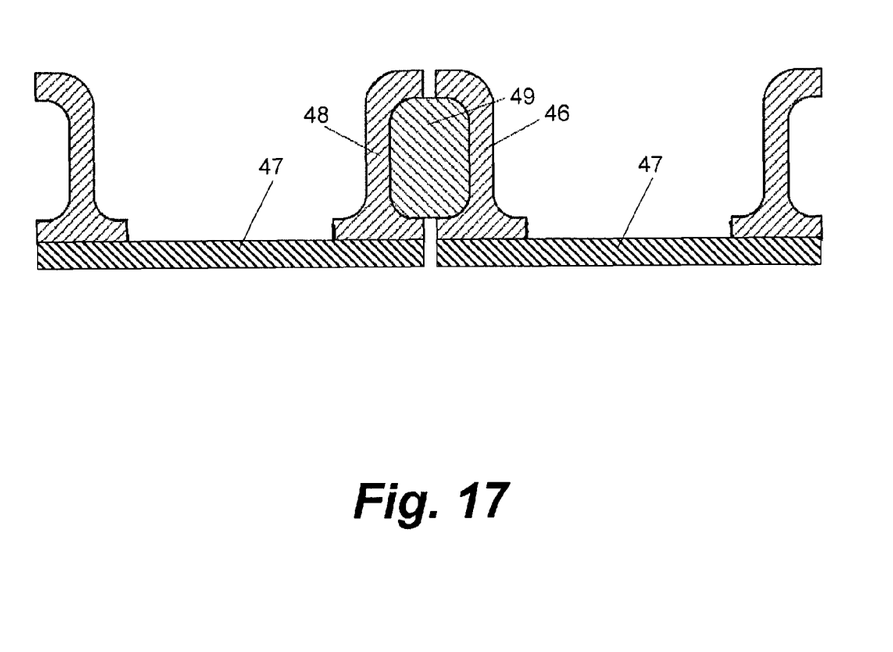

In the embodiment of FIG. 17, the profile for manufacturing the hose is achieved in a different manner. The hose comprises the web part 47, the welding material 49, as well as the upright parts 48 at the ends of the profile.

As is the case with all the other embodiments mentioned herein, the profile is manufactured by co-extrusion of two materials 47 and 46, 48 (or more). In alternative embodiments, it is possible to manufacture both the web parts as well as the upright parts from the same material.

In these embodiments, the web parts 47 of the adjacent windings touch or practically touch each other. The reinforcement ribs, which are formed by the upright parts 46 and 48 and the welding material 49 that is applied in between, will substantially be placed on top of the web parts 47. The welding material 49 can be applied entirely between the upright parts 46, 48 as is shown and possibly also be applied between web parts 47, but in alternative embodiments, for example solely between the parts facing each other at the top and at the bottom of the upright parts 46, 48 such that a hollow rib is formed.

The advantage of this construction with a rib on top of the web parts is that a hose with a smoother inside can be obtained. In addition, in case the web part is manufactured of a conductive material and the adjacent web parts are laterally in contact with each other, it is possible to obtain an improved electrical conductivity of the hose than in case the web parts are not in contact with each other (in that case, the conduction of the electrical current occurs helically, such that the length of the conducting track and the overall resistance increases proportionally to the circumference and the number of windings).

As with the other herein described embodiments, electrical wires can be incorporated in this profile at different designated locations, or a hollow space can be provided in the profile. Instead of an electrical wire, a reinforcement wire can also be provided (for example in metal or a hard plastic material, such as in the case of stretchable hoses).

The web part 47 can be produced, for example, in a TPE material. The rib (upright parts 46, 48 and welding material 49) can be produced, for example, in a PP material. However, multiple other combinations of materials are possible. Web part and rib may have different shapes. The dimensions of the web part and the rib can be changed and adapted to give the hose certain properties: a more flexible hose, a more rigid hose, many or few turns per unit length, predetermined hub strength and so on.

The invention claimed is:

1. A flexible plastic hose comprising a flexible wall made out of a plurality of laterally connected windings of a helically wound profile,
    wherein the windings of the profile are attached to each other by means of a weld,
    wherein the profile comprises a web part with predetermined properties for providing flexibility to the hose, and wherein the profile ends on both sides in a upright part, which is each time provided with a horizontal leg that extends in line with the web part and in the direction of the adjacent winding with which the weld is formed, and wherein the weld is located between the upright parts of adjacent windings and on top of the horizontal legs and together with these upright parts and horizontal legs forms a helical reinforcement rib on the flexible wall of the hose with predetermined properties for providing hub strength to the hose.

2. Flexible plastic hose according to claim 1, wherein the upright parts (26, 28) comprise protrusions (29, 30), directed towards the adjacent winding and in such a way that they overlap each other.

3. Flexible plastic hose according to claim 1, wherein the upright parts (16, 18) of the adjacent windings are folded towards each other at the top and substantially completely enclose the weld (19).

4. Flexible plastic hose according to claim 3, wherein the upright parts (32, 34) of the adjacent windings overlap each other at the top.

5. Flexible plastic hose according to claim 1, wherein the profile is essentially U-shaped.

6. Flexible plastic hose according to claim 1, wherein the upright parts of the profile have an inverted Tshape.

7. Flexible plastic hose according to claim 1, wherein the profile is symmetrical.

8. Flexible plastic hose according to claim 1, wherein the flexible wall has an inside diameter of 10 to 19 mm.

9. Flexible plastic hose according to claim 1, wherein one or more electrical conductors or cables (20, 21, 24, 25) is/are embedded in the reinforcement rib.

10. Flexible plastic hose according to claim 1, wherein one or more electrical conductors or cables (22, 23) is/are embedded in the web part.

11. Flexible plastic hose according to claim 1, wherein the web part comprises an unfoldable part (36) that is provided to be unfolded when an axial tensile force is exerted onto the hose, such as to provide an elongation of the hose.

12. Flexible plastic hose according to claim 1, wherein the web part comprises collapsible parts (37, 38).

13. Flexible plastic hose according to claim 1, wherein the upright parts and the weld are manufactured from compatible materials.

14. Flexible plastic hose according to claim 1, wherein the upright parts and the weld are manufactured from the same material.

15. Flexible plastic hose according to claim 1, wherein the web parts of adjacent windings of the hose are laterally in contact with each other.

16. Flexible plastic hose according to claim 15, wherein the web parts are manufactured from a conductive material.

* * * * *